United States Patent [19]
Heyman et al.

[11] 3,924,444
[45] Dec. 9, 1975

[54] ULTRASONIC CALIBRATION DEVICE

[75] Inventors: Joseph S. Heyman, Gloucester, Va.; James G. Miller, Clayton, Mo.

[73] Assignee: The United States of America as represented by the United States National Aeronautics and Space Administration Office of General Counsel-Code GP, Washington, D.C.

[22] Filed: Nov. 11, 1974

[21] Appl. No.: 522,556

[52] U.S. Cl. .................................. 73/1 R; 310/8.2
[51] Int. Cl.² ........................................... G01M 7/00
[58] Field of Search ....................... 73/1 R; 310/8.2

[56] References Cited
UNITED STATES PATENTS 3,218,488  11/1965  Jacke .................... 310/8.2
3,531,977  10/1970  Chaskelis ................ 73/1 R
3,608,352  9/1971   Walton .................... 73/1 R Primary Examiner—S. Clement Swisher
Attorney, Agent, or Firm—Howard J. Osborn; William H. King; John R. Manning

[57] ABSTRACT

This invention is an ultrasonic calibration device for producing known changes in both acoustic absorption and phase velocity. The calibration signal arises from an actual change of acoustic parameters, not from an electrical simulation. Thus, changes in ultrasonic time-domain decay rates and frequency-domain line widths are produced. Therefore, the device is able to simulate not only changes in ultrasonic absorption and phase velocity but also the sensitivity enhancement achieved by the use of ultrasonic resonators. The latter simulation cannot be achieved using electrical calibration techniques.

8 Claims, 1 Drawing Figure

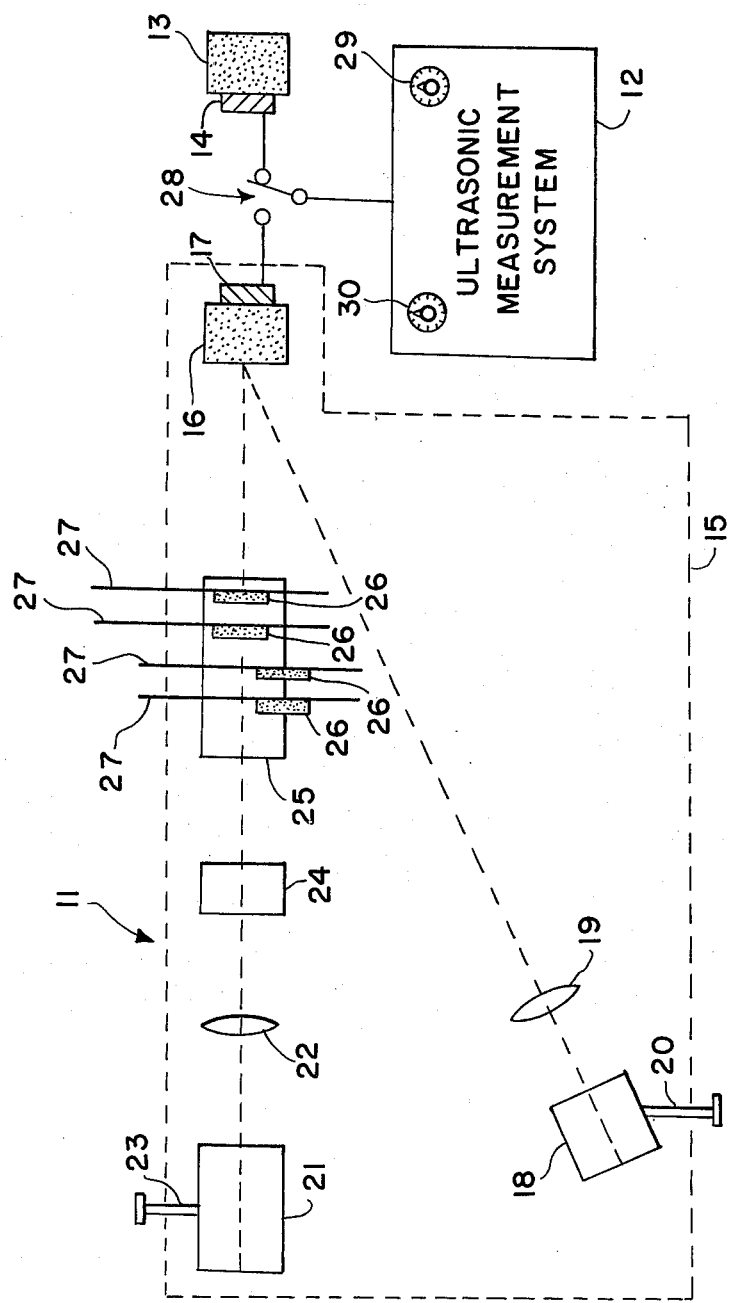

ULTRASONIC CALIBRATION DEVICE

ORIGIN OF THE INVENTION

The invention described herein is assigned to the United States Government and may be manufactured and used by or for the Government for governmental purposes without the payment of any royalties thereon or therefor.

BACKGROUND OF THE INVENTION

The invention relates generally to ultrasonics and more specifically concerns a device for calibrating ultrasonic instruments.

The primary parameters of interest in most ultrasonic measurements are the absorption coefficient $\alpha$ and the phase velocity $v$. Small changes in these parameters due to an external stimulus can give information as to the physical, electronic, and optical properties of the studied sample material. Therefore, a device for calibrating an ultrasonic system for small changes in both $\alpha$ and $v$ is a valuable device. Existing calibration devices rely on an electrical simulation of the acoustic event which gives rise to the changes in acoustic attenuation and phase velocity. Although electrical calibration schemes of this sort are adequate in some respects, they cannot properly include the sensitivity enhancement factors nor the resonance line width or mode decay time which arise from the use of ultrasonic resonators. It is therefore the primary object of this invention to provide a calibration device that can properly include the above factors which arise from the use of ultrasonic resonators.

SUMMARY OF THE INVENTION

This invention is an ultrasonic calibration device capable of producing known changes in both acoustic attenuation and phase velocity while simulating the essential ultrasonic properties of the specimen of interest. The calibration results from actual changes in acoustic properties rather than from an electrical simulation. Hence, the calibrator accounts for not only the electronic characteristics of the instrument but also the sensitivity enhancement factors associated with the acoustic resonator. The calibration technique is based on the use of a cadmium sulfide (CdS) crystal whose ultrasonic properties can be adjusted and modulated with light beams.

The ultrasonic calibration device includes a composite resonator, a bias lamp and a signal lamp. The composite resonator consists of a CdS crystal bonded to an appropriate transducer so that longitudinal ultrasonic waves can be propagated along the c-axis. A flat and parallel single crystal of CdS is prepared from high-purity photoconductor material. Light from both the bias and the signal lamps, which are powered by constant current sources, is focused on the CdS crystal. A light chopper and a platform carrying neutral-density filters are in the optical path of the signal lamp. The entire assembly is housed in a light-tight enclosure external to which are controls that insert or retract various combinations of neutral density filters.

The physical basis for the calibration scheme is as follows. Because CdS is a good photoconductor, light incident on the crystal can change its electrical conductivity by many orders of magnitude. Since the charge carriers are coupled to the elastic properties of CdS by the piezoelectric mechanism, changes in electrical conductivity result in changes in ultrasonic phase velocity and absorption.

BRIEF DESCRIPTION OF THE DRAWING

The sole figure in this application is a block diagram of a preferred embodiment of the invention.

DETAILED DESCRIPTION OF THE INVENTION

Turning now to the embodiment of the invention selected for illustration in the drawing, the number 11 designates an ultrasonic calibrating device that constitutes an embodiment of this invention. The ultrasonic calibrating device 11 can be used to calibrate any ultrasonic system 12 that is used to measure small changes in absorption coefficient and phase velocity of a sample 13. Sample 13 coupled to the ultrasonic measuring system 12 by means of a suitable transducer 14. The ultrasonic calibrating device 11 is housed in a light-tight enclosure 15 and includes a resonator consisting of a CdS crystal 16 with a transducer 17 bonded to it. Crystal 16 is made from a boule of single crystal material and has dimensions of 7mm × 7mm × 1mm thick. Obviously, the crystal can have other dimensions without departing from the invention. A constant current bias lamp 18 has its light focused onto CdS crystal 16 by means of a lens 19 and a constant current signal lamp 21 has its light focused onto CdS crystal 16 by means of a lens 22. Adjustable means 20 and 23 extend through the walls of enclosure 15 for adjusting the intensity of the light produced by bias lamp 18 and signal lamp 21, respectively. A light chopper 24 is located such that it can be placed in or out of the path of the light from lamp 21. A platform 25 for holding a number of calibrated neutral density filters 26 is located such that the filters can be selectively placed in any combination in the path of the light from signal lamp 21. Each of these filters 26 includes means 27 extending through the walls of enclosure 15 for enabling one to place it in or out of the path of the light. A switch 28 is connected to transducers 14 and 17 and to ultrasonic measuring system 12 to enable one to connect the measuring system to either the calibrating device 11 or the sample 13.

Measuring system 12 has an adjustable means 29 for varying the amplitude of its signal and an adjustable means 30 for varying the frequency of its signal to match the resonant frequencies of sample 13 and crystal 16. In operation, the CdS resonator 16 is substituted for the specimen 13 by means of switch 28 and the intensity of the bias lamp 18 is adjusted by adjustable means 20 to produce a background ultrasonic attenuation $\alpha_0$ equal to that of the specimen 13. For the CdS resonator used in this device, the value of $\alpha_0$ can be varied by nearly two orders of magnitude. This permits the background attenuation and hence the sensitivity enhancement factors of many specimens of ultrasonic interest to be simulated.

After the appropriate $\alpha_0$ is selected, initial calibration of the instrument is achieved by comparison with external standards, a precision attenuator for the case of absorption and a frequency counter for the case of dispersion. Once this simple initialization procedure has been carried out, the instrument is capable of producing accurately known changes in ultrasonic attenuation and phase velocity over a wide dynamic range by selectively placing different combinations of filters 26 in the path of the light from lamp 21. Changes in attenuation or phase velocity which are so large as to be appreciable fractions of $\alpha_0$ or $v_0$, respectively, are of little interest since for these cases sensitive ultrasonic instruments and the associated calibrators are not necessary. At the other extreme, since arbitrarily small changes in light travel level and hence in acoustic attenuation and phase velocity can be produced, the detection of such very small changes is limited by the noise of the ultrasonic measurement system 12 as well as by the noise produced in the CdS resonator. Light sources of excellent amplitude stability are required to keep noise in the CdS resonator negible in comparison with that arising from the instrument to which the calibrator is attached. For even better stability, lasers or light emitting diodes may be used as the bias as well as the modulated light source.

For dc-coupled systems, light chopper 24 is switched off. Changes in ultrasonic parameters are produced by the appropriate insertion, or removal, of neutral-density filters 26 in the signal lamp optical path. For ac-coupled systems, light chopper 24 produces a modulation ultrasonic absorption and/or dispersion at the chopping frequency. Calibrated changes in the amplitude of this modulation are achieved with the aid of the neutral-density filters.

For use with the calibration device, the CdS resonator must not only be capable of producing changes in attenuation and phase velocity comparable to those occuring in the specimen of interest but also the CdS resonator must simulate the ultrasonic sensitivity enhancement factors provided by that specimen. Sensitivity enhancement factors are determined largely by the value of background ultrasonic attenuation and sample length. Thus the background attenuation of the CdS resonator is set equal to that of the specimen of interest by adjusting the intensity of illumination impinging upon the CdS crystal from the bias lamp. The dependence on the sample length is trivially accounted for by multiplying the calibrator output by the ratio of sample length 16 to sample length 13. Although sensitivity enhancement factors also depend to some extent upon the value of ultrasonic phase velocity $v_0$, this dependence on $v_0$ is far less pronounced than that on $\alpha_0$. The fact that the value of $v_0$ in the CdS resonator cannot be set equal to that in the specimen of interest while maintaining the equality of background attenuation does not constitute a serious limitation. The range of background attenuation typically encountered extends over several orders of magnitude. It is substantially more important that the CdS resonator be capable of matching the value of $\alpha_0$ than that of the value of $v_0$ since the value of the ultrasonic phase velocity in any specimen of interest rarely deviates by more than a factor of three from that in the CdS resonator.

The advantages of this invention are that it can produce much smaller calibrated signal changes than any other true external standard, it can produce correct time domain as well as frequency domain effects (i.e., the decay time of a resonance mode for the time domain and resonance width for frequency domain) and it automatically takes into account sensitivity enhancement factors by the setting of the correct background attenuation $\alpha_0$.

It is to be understood that the form of the invention herewith shown and described is to be taken as a preferred embodiment. Various changes can be made without departing from the invention. For example, if the instrument to be calibrated measures parameters of a sample connected in a transmission assembly with two transducers then the CdS crystal 16 can have two transducers bonded to it.

What is claimed is:

1. An ultrasonic calibration device for calibrating an ultrasonic instrument that measures the absorption coefficient and phase velocity of a sample under study comprising: a piezoelectric crystal of photoconducting material with transducer means attached to it to form an ultrasonic resonator; bias lamp means for focusing light onto said crystal to simulate the background absorption coefficient of said sample; and signal lamp means for focusing light onto said crystal to simulate changes in absorption coefficient and phase velocity of said sample.

2. An ultrasonic calibration device according to claim 1 wherein said piezoelectric crystal is a crystal of cadmium sulfide.

3. An ultrasonic calibration device according to claim 1 wherein said bias lamp means includes means for adjusting the intensity of light produced by said bias lamp means.

4. An ultrasonic calibration device according to claim 1 wherein said signal lamp means includes a light modulator system for the said signal lamp means.

5. An ultrasonic device according to claim 4 wherein said modulator system includes a light chopper.

6. An ultrasonic calibration device according to claim 1 further including a light-tight enclosure for said calibration device.

7. An ultrasonic calibration device according to claim 1 wherein said signal lamp means includes means for adjusting the intensity of light produced by said signal lamp means.

8. An ultrasonic calibration device according to claim 7 wherein said signal lamp means includes means for inserting selected calibrated neutral density filters in the path of the light from said signal lamp means.

* * * * *